Dec. 6, 1966 T. HORVATH 3,289,486
CLUTCH TRANSMISSION
Filed Nov. 18, 1963
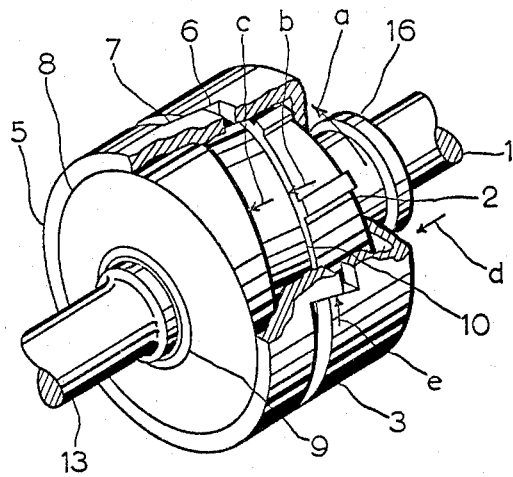
Fig. 1.
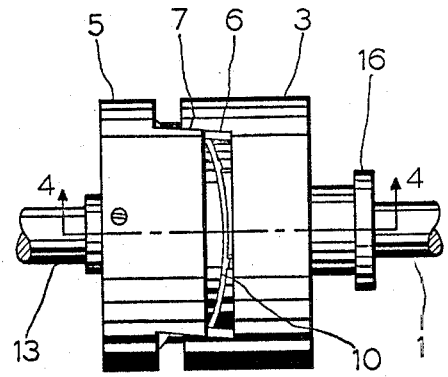
Fig. 2.
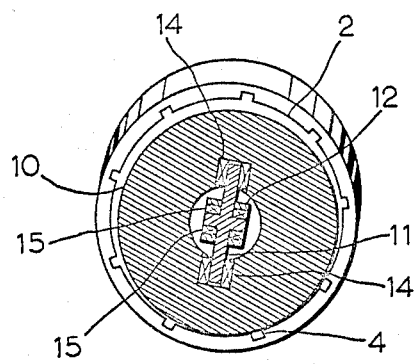
Fig. 3.
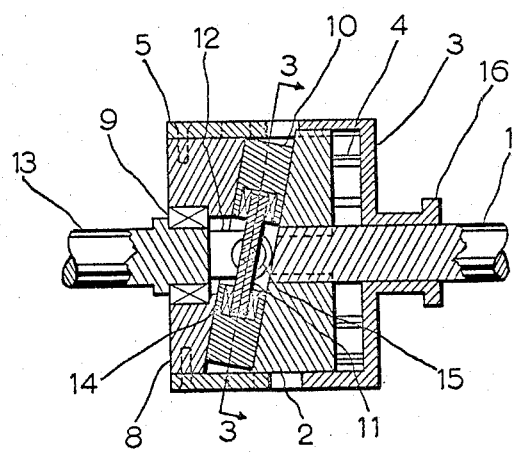
Fig. 4.
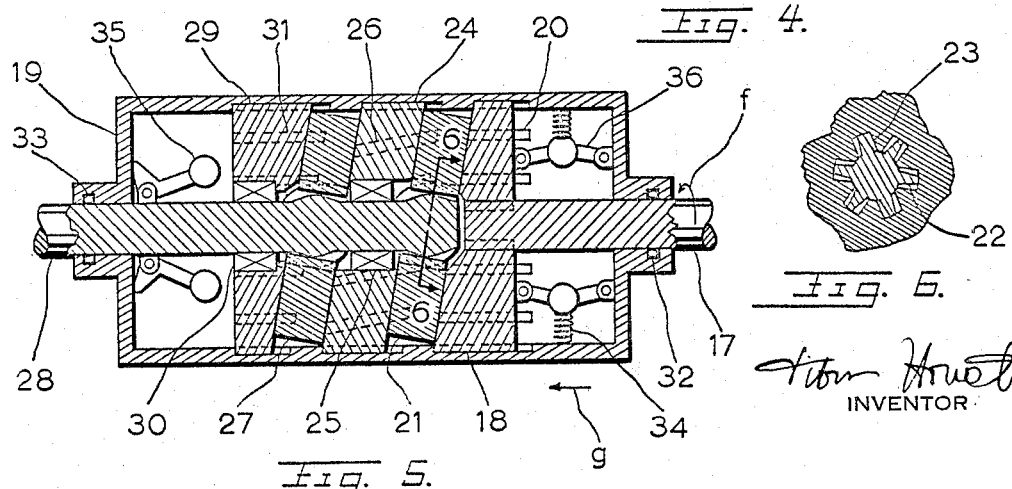
Fig. 5.
Fig. 6.
Tibor Horvath
INVENTOR

United States Patent Office 3,289,486
Patented Dec. 6, 1966

3,289,486
CLUTCH TRANSMISSION
Tibor Horvath, 944 Avenue R, Brooklyn, N.Y.
Filed Nov. 18, 1963, Ser. No. 324,580
8 Claims. (Cl. 74—64)

This invention concerns a transmission which is capable of providing an infinite range of speed ratios between a drive and driven shaft.

One object of this invention is to provide a clutch-like transmission system which will last longer than any known clutch transmission system.

A further object of this invention is to provide simplicity in its construction and parts.

Another object is to provide a transmission assembly which can be used as a braking system, or as a speed regulator system.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is an isometric drawing of a transmission assembly (parts broken away for clarity).

FIG. 2 is a side elevational view of a transmission assembly embodying the invention.

FIG. 3 is a sectional view taken on line 3—3 of FIG. 4.

FIG. 4 is also a sectional view taken on line 4—4 of FIG. 2.

FIG. 5 is a sectional view of an automatic transmission assembly according to the invention.

FIG. 6 is a sectional view taken on line 6—6 of FIG. 5.

Referring to FIGS. 1–4, there is shown shaft 1 which is the drive shaft driven by the prime mover, engine or other power source (not shown). Directly connected to shaft 1 is a cylindrical shaped unit 2 which has an angularly cut end. Said unit 2 and shaft 1 hold a hollow cylindrical object 3 which is able to slide axially along slots 4 and shaft 1. Object 3 hooks up to similarly constructed part 5 (except as noted) through angularly cut teeth 6 and 7. Part 5 is solidly attached to a cylindrical item 8 fitting the description of unit 2 (except as noted). Item 8 is supported by driven shaft 13 through bearing 9 to provide independent rotation from said shaft.

Between unit 2 and item 8 there is a disc shaped unit 10 which is held by the longer ends of cross 11 (see FIG. 3). Said cross is held at its shorter ends by a fork 12 which is part of shaft 13. Cross 11 thus provides a universal joint between disc 10 and driven shaft 13. Bearings 14 in disc 10 and bearings 15 in fork 12 provide for smoother wobbling action of disc 10 on shaft 13.

There is a flange 16, part of object 3, used to operate the apparatus.

FIGS. 5 and 6 illustrate a double setup of the above described mechanism with minor alterations.

FIGS. 1–4 illustrate the single disc mechanism which has a one-sided transfer of power.

The double disc assembly has a balanced power transmission which will be discussed later in this text. The assembly consists of a prime shaft 17 driven by a power (not shown). Attached directly to this shaft is a unit 18, resembling in description that of unit 2 in FIGS. 1–4.

Unit 18 is also held by a cylindrical housing 19 through slots 20. The ends of housing 19 are located on prime shaft 17 and driven shaft 28.

Next to unit 18 is a disc shaped object 21 which is supported by driven shaft 28. Said shaft has external teeth 22, shaped as illustrated in FIGS. 5 and 6. These teeth hold disc 21 by its internal teeth 23. There is enough clearance between teeth 22 and 23 to give disc 21 free wobbling action (see FIG. 6).

Next to disc 21 is a cylindrical object 24 which has angularly cut ends, as illustrated in FIG. 5.

Cylinder 24 is held by shaft 28 through bearing 25 and by housing 19 through slots 26 which are situated in a helical form (see FIG. 5) to provide slight relative rotation of said cylinder to unit 18 by moving housing 19 along shafts 17 and 28.

Next to object 24 is another disc shaped unit 27 which is located on shaft 28 in the same manner as disc 21.

Next to disc 27 is another cylinder shaped object 29 which is constructed very much like object 18 (except as noted) and held by shaft 28 through bearing 30 and by slots 31 of housing 19. At both ends of said housing are seals 32 and 33. To operate this mechanism there are two sets of governors 35 and 36. Governor 35 is activated by driven shaft 28, and governor 36 is activated by prime shaft 17. There is a set of springs 34 to balance the force of the weights of governor 36 for idling position.

In operation of the transmission (FIGS. 1–4), suppose that shaft 1 is rotating in the direction indicated by arrow *a* in FIG. 1. Shaft 1 will rotate unit 2 which carries cylinder shaped object 3 through its slots 4. Since object 3 is hooked up to part 5, it will rotate part 5 and item 8 which are held together by hardware or other means. Disc 10, which is between cylindrical unit 2 and item 8, will not rotate since the surfaces of disc 10 and unit 2 and item 8 are well lubricated and there is a small distance between disc 10 and item 8. Instead, unit 2, which is face to face against disc 10, will push one portion of said disc in the direction indicated by arrow *b* in FIG. 1. Arrow *b* represents the center of the many pressure points spread out on that half of unit 2. As a result, that portion of disc 10 will move in the direction indicated by arrow *c*, but it will not press against item 8 because said item moves simultaneously with unit 2 thus providing a free wobbling action to disc 10.

When object 3 is moved in the direction indicated by arrow *d* of FIG. 1, part 5 and item 8 are forced to stay behind in rotation of unit 2. This happens because of the angularly cut teeth 6 and 7.

This action results in some pressure coming through from disc 10 to item 8. Thus item makes it more difficult for the disc 10 to wobble, consequently applying rotating power to driven shaft 13. When item 8 is forced to stay behind the rotation of unit 2, to such an extent that all the pressure from unit 2 comes through disc 10 to item 8 (see arrows *b* and *c*), before unit 2 could transfer any rotating force into part 5 by way of object 3 (see arrow *e*), disc 10 could keep up its wobbling action without rotating shaft 13, only by directly rotating item 8. However, because of the angle in which that end of item 8 is cut, this would not happen. Instead, unit 2 will press one half (see arrow *b* of FIG. 1) of disc 10 against item 8 and carry both. This action will put a one-to-one ratio of rotation between prime shaft 1 and driven shaft 13.

In FIGS. 5 and 6, the operation is similar to the operation described in FIGS. 1–4. The prime shaft 17 which is driven by a power source (not shown) holds unit 18 which drives item 24 and unit 29. Units 18 and 29 could be compared with unit 2 of FIGS. 1–4 as far as their part in the operation is concerned.

The action of item 24 is also similar to that of item 8 in FIGS. 1–4.

Though their hook-up to shaft 28 is different, discs 21 and 27 also serve the same purpose as disc 10 in FIGS. 1–4.

While shaft 17, units 18 and 29, item 24, and housing 19 are rotating in the direction indicated by arrow *f* in FIG. 5, discs 21 and 27 are wobbling freely since there is a small gap between item 24 and discs 21 and 27.

When housing 19 moves in the direction indicated by arrow *g*, said housing forces item 24 to stay behind in rotation of units 18 and 29. This action is caused by the helically positioned slots 26 situated on housing 19.

Thus, discs 21 and 27 are squeezed between units 18 and 29 and item 24. Since wobbling action is more difficult under these circumstances, power will be transferred to shaft 28.

When item 24 is forced to stay behind in rotation of units 18 and 29, to such an extent that all the power from units 18 and 29 comes through discs 21 and 27, said discs will put a one-to-one ratio of power between shafts 17 and 28 in the same manner as described in the operation of the transmission assembly (see FIGS. 1–4).

However, in this operation there is a balanced power transmission to shaft 28 on disc 21. The viewed side (not shown because of cutaway view, see FIG. 5) is the side on which the power is transmitted from unit 18 and item 24 to disc 21, while on disc 27 it is the far side to which the power is transmitted from unit 29 and item 24. If it is desirable not to have any wobbling action of discs (described in the invention) while idling, the prime shaft and driven shaft could be reversed.

While I have illustrated and described the preferred embodiments of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A transmission for shaft speed regulation comprising a drive shaft, a driven shaft, and a cylinder assembly operatively connecting said drive and driven shafts, said cylinder assembly comprising a disc, and two hollow cylinders, and two solid cylinders, and a bearing operatively connecting one of said solid cylinders to said driven shaft, other said solid cylinder being mounted on said drive shaft, said solid cylinders having angularly cut surfaces, each said solid cylinder being situated inside one of said hollow cylinders, said hollow cylinders being connected to each other by angularly cut teeth, one said hollow cylinder being mounted on its corresponding solid cylinder, the other said hollow cylinder being connected on its corresponding solid cylinder in such a way as to enable said hollow cylinder to slide axially on said corresponding solid cylinder, said sliding axial movement causing said solid cylinders to grip said disc which is held by said driven shaft through a universal joint, said disc transferring power to said driven shaft.

2. A transmission for shaft speed regulation comprising a drive shaft, a driven shaft, and a cylinder assembly operatively connecting said drive and driven shafts, said cylinder assembly comprising a disc, and two hollow cylinders, and two solid cylinders, and a bearing operatively connecting one of said solid cylinders to said driven shaft, other said solid cylinder being mounted on said drive shaft, said solid cylinders having angularly cut surfaces, each said solid cylinder being situated inside one of said hollow cylinders, said hollow cylinders being connected to each other by angularly cut teeth, one said hollow cylinder being mounted on its corresponding solid cylinder, the other said hollow cylinder being connected on its corresponding solid cylinder in such a way as to enable said hollow cylinder to slide axially on said corresponding solid cylinder, said axial movement causing said solid cylinders to grip said disc which is held by said driven shaft through a set of internal and external teeth, said disc transferring power to said driven shaft.

3. A transmission for braking control, comprising a stationary shaft, a driven shaft driven by a power source, and a cylinder assembly operatively connecting said stationary and driven shafts, said cylinder assembly comprising a disc, and two hollow cylinders, and two solid cylinders, and a bearing operatively connecting one of said solid cylinders to said stationary shaft, other said solid cylinder being mounted on said driven shaft, said solid cylinders having angularly cut surfaces, each said solid cylinder being situated inside one said hollow cylinder, said hollow cylinders being connected to each other by angularly cut teeth, one said hollow cylinder being mounted on its corresponding solid cylinder, the other said hollow cylinder being connected on its corresponding solid cylinder in such a way as to enable said hollow cylinder to slide axially on said corresponding solid cylinder, said sliding axial movement causing said solid cylinders to grip said disc which is held by said stationary shaft through a universal joint, said disc varying the speed of said driven shaft.

4. A transmission for braking and speed regulation comprising a stationary shaft, a driven shaft driven by a power source, and a cylinder assembly operatively connecting said stationary and driven shafts, said cylinder assembly comprising a disc, and two hollow cylinders, and two solid cylinders, and a bearing operatively connecting one of said solid cylinders with said stationary shaft, other said solid cylinder being mounted on said driven shaft, said solid cylinders having angularly cut surfaces, each said solid cylinder being situated inside one said hollow cylinder, said hollow cylinders being connected to each other by angularly cut teeth, one said hollow cylinder being mounted on its corresponding solid cylinder, the other said hollow cylinder being connected on its corresponding solid cylinder in such a way as to enable said hollow cylinder to slide axially on said corresponding solid cylinder, said sliding axial movement causing said solid cylinders to grip said disc which is held by said stationary shaft through a set of external and internal teeth, said disc regulating the speed of said driven shaft.

5. A transmission for automatic shaft speed regulation comprising a drive shaft, a driven shaft, and a cylinder assembly operatively connecting said drive and driven shafts, said cylinder assembly comprising one hollow cylinder, said hollow cylinder enclosing two discs, three angularly cut solid cylinders, inside of said hollow cylinder having three sets of slots, said slots connecting said solid cylinders with said hollow cylinder, two of said three sets of slots being formed parallel with the axis of said hollow cylinder, third set of said slots being positioned in a helical form, said third set of slots being situated in between the other two said slots, the periphery of said solid cylinders being formed to match said hollow cylinder's slots, said discs and solid cylinders placed alternately with each other, two bearings operatively connecting middle said solid cylinder and one of the other two solid cylinders to said driven shaft, the third said solid cylinder being mounted on said drive shaft, two governors, one of said governors being operated by said drive shaft said other governor being operated by said driven shaft, both said governors controlling the axial movement of said hollow cylinder, said axial movement causing said solid cylinders to grip said discs, said discs transferring power to said driven shaft through a universal joint.

6. A transmission for automatic shaft speed regulation comprising a drive shaft, a driven shaft, and a cylinder assembly operatively connecting said drive and driven shafts, said cylinder assembly comprising one hollow cylinder, said hollow cylinder enclosing two discs, three angularly cut solid cylinders, inside of said hollow cylinder having three sets of slots, said slots connecting said solid cylinders with said hollow cylinder, two of said three sets of slots being formed parallel with the axis of said hollow cylinder, third set of said slots being positioned in a helical form, said third set of slots being situated in between the other two said slots, the periphery of said solid cylinders being formed to match said hollow cylinder's slots, said discs and solid cylinders placed alternately with each other, two bearings operatively connecting middle said solid cylinder and one of the other two solid cylinders to said driven shaft, the third said solid cylinder being mounted on said drive shaft, two governors, one of said governors being operated by said drive shaft said other governor being operated by said driven shaft, both said governors controlling the axial movement of said hollow cylinder, said axial movement causing said solid cylinders to grip said discs, said discs transferring power to said driven shaft through a set of internal and external teeth.

7. A ratchetlike apparatus comprising a drive shaft, a driven shaft, and a cylinder assembly operatively connecting said drive and driven shafts, said cylinder assembly consisting of two angularly cut solid cylinders, one of said cylinders being held by said drive shaft, the other said cylinder being held by said driven shaft through a bearing to permit free rotation of said cylinder, a disc being situated between said cylinders, said disc being held by said driven shaft through a universal joint, a spring being connected to said two cylinders in such a manner that the tension of said spring forces said two cylinders to turn in opposite directions, whereby when power is transmitted through said drive shaft into corresponding cylinder in the same direction as said spring tends to rotate said cylinder, said disc is trapped between said cylinders, thus transferring power into said driven shaft, however, when power is transmitted through said drive shaft into corresponding cylinder in the opposite direction from that of which said spring tends to rotate said cylinder, said spring expands, thus allowing a loose contact between said disc and said cylinders, said cylinders rotating freely with no transference of power to said driven shaft.

8. A ratchetlike apparatus comprising a drive shaft, a driven shaft, and a cylinder assembly operatively connecting said drive and driven shafts, said cylinder assembly consisting of two angularly cut solid cylinders, one of said cylinders being held by said drive shaft, the other said cylinder being held by said driven shaft through a bearing to permit free rotation of said cylinder, a disc being situated between said cylinders, said disc being held by said driven shaft through a set of internal and external teeth, a spring being connected to said two cylinders in such a manner that the tension of said spring forces said two cylinders to turn in opposite directions, whereby when power is transmitted through said drive shaft into corresponding cylinder in the same direction as said spring tends to turn said cylinder, said disc is trapped between said cylinders, thus transferring power into said driven shaft, however, when power is transmitted through said drive shaft into corresponding cylinder in the opposite direction from that of which said spring tends to turn said cylinder, said spring expands, thus allowing a loose contact between said disc and said cylinders, said cylinders rotating freely with no transference of power to said driven shaft.

References Cited by the Examiner
UNITED STATES PATENTS

| | | | |
|---|---|---|---|
| 1,552,305 | 9/1925 | Hulett | 74—650 |
| 1,726,288 | 8/1929 | Couloumbe | 74—650 |
| 2,830,685 | 4/1958 | Humphrey | 192—30 X |

FRED C. MATTERN, Jr., *Primary Examiner.*

BROUGHTON G. DURHAM, *Examiner.*

F. E. BAKER, *Assistant Examiner.*